(12) United States Patent
Townson et al.

(10) Patent No.: US 8,979,180 B2
(45) Date of Patent: Mar. 17, 2015

(54) DETACHABLE POSITIONING AND REINFORCEMENT STRUCTURE AND METHOD OF DISASSEMBLING A FRONT END ASSEMBLY FOR A VEHICLE

(71) Applicant: GM Global Technology Operations LLC, Detroit, MI (US)

(72) Inventors: James M. Townson, Clarkston, MI (US); Mark L. Felzien, Rochester Hills, MI (US); Alexander C. Winter, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/734,488

(22) Filed: Jan. 4, 2013

(65) Prior Publication Data

US 2014/0191538 A1    Jul. 10, 2014

(51) Int. Cl.
*B60J 7/00* (2006.01)
*B62D 67/00* (2006.01)
*B62D 25/08* (2006.01)

(52) U.S. Cl.
CPC .............. *B62D 67/00* (2013.01); *B62D 25/085* (2013.01)

USPC ...................................................... 296/193.09

(58) Field of Classification Search
CPC .......... A63H 27/00; B64C 27/33; B64C 9/24; Y02T 50/32; A01B 73/044
USPC ...................................................... 296/193.09
See application file for complete search history.

(56) References Cited

U.S. PATENT DOCUMENTS

| | | | |
|---|---|---|---|
| 6,679,545 B1 * | 1/2004 | Balzer et al. ............. | 296/193.09 |
| 6,948,769 B2 * | 9/2005 | Borkowski et al. ...... | 296/203.02 |
| 6,997,490 B2 * | 2/2006 | Evans et al. .................. | 293/120 |
| 7,007,385 B2 * | 3/2006 | Tarahomi ..................... | 29/897.2 |
| 7,048,326 B2 * | 5/2006 | Yasui ....................... | 296/203.02 |

* cited by examiner

*Primary Examiner* — Kiran B Patel
(74) *Attorney, Agent, or Firm* — Cantor Colburn LLP

(57) ABSTRACT

A detachable positioning and reinforcement structure includes a first wing structure operably coupled to a first automotive component. Also included is a second wing structure operably coupled to a second automotive component. Further included is a central portion removably coupled to the first wing structure, the second wing structure and a third automotive component disposed rearwardly of the central portion.

8 Claims, 10 Drawing Sheets

# DETACHABLE POSITIONING AND REINFORCEMENT STRUCTURE AND METHOD OF DISASSEMBLING A FRONT END ASSEMBLY FOR A VEHICLE

FIELD OF THE INVENTION

The subject invention relates to vehicles, and more particularly to a detachable positioning and reinforcement structure of a front end assembly, as well as a method of disassembling a front end assembly for a vehicle.

BACKGROUND

Vehicles, such as automobiles, include front end assemblies that comprise a chassis frame and a plurality of body components mounted thereon. An engine employed for powering the vehicle is typically located proximate the front end assembly at an interior region of the plurality of body components and indirectly supported on the chassis frame. The plurality of body components and the chassis frame often form a complicated assembly that includes a large number of various mechanical fasteners, as well as welded components.

The complicated front end assembly poses issues related to servicing and repair of a variety of automotive components associated with the front end assembly. For example, maintenance or replacement of a single component typically requires removal of at least a few, and often several, front end assembly components. Removal of several components may be referred to as a "teardown" of the front end assembly. This is particularly common if the engine itself must be accessed. Teardown to access one or more components is undesirable based on resultant extended service time and additional cost.

SUMMARY OF THE INVENTION

In one exemplary embodiment of the invention, a detachable positioning and reinforcement structure includes a first wing structure operably coupled to a first automotive component. Also included is a second wing structure operably coupled to a second automotive component. Further included is a central portion removably coupled to the first wing structure, the second wing structure and a third automotive component disposed rearwardly of the central portion.

In another exemplary embodiment of the invention, a method of disassembling a front end assembly for a vehicle is provided. The method includes decoupling a central portion of a positioning and reinforcement structure from a first wing structure and a second wing structure, wherein the first wing structure is mechanically fastened to a first side member and the second wing structure is mechanically fastened to a second side member. Also included is decoupling the central portion from an automotive component disposed rearwardly of the central portion for providing access to a plurality of front end assembly components.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
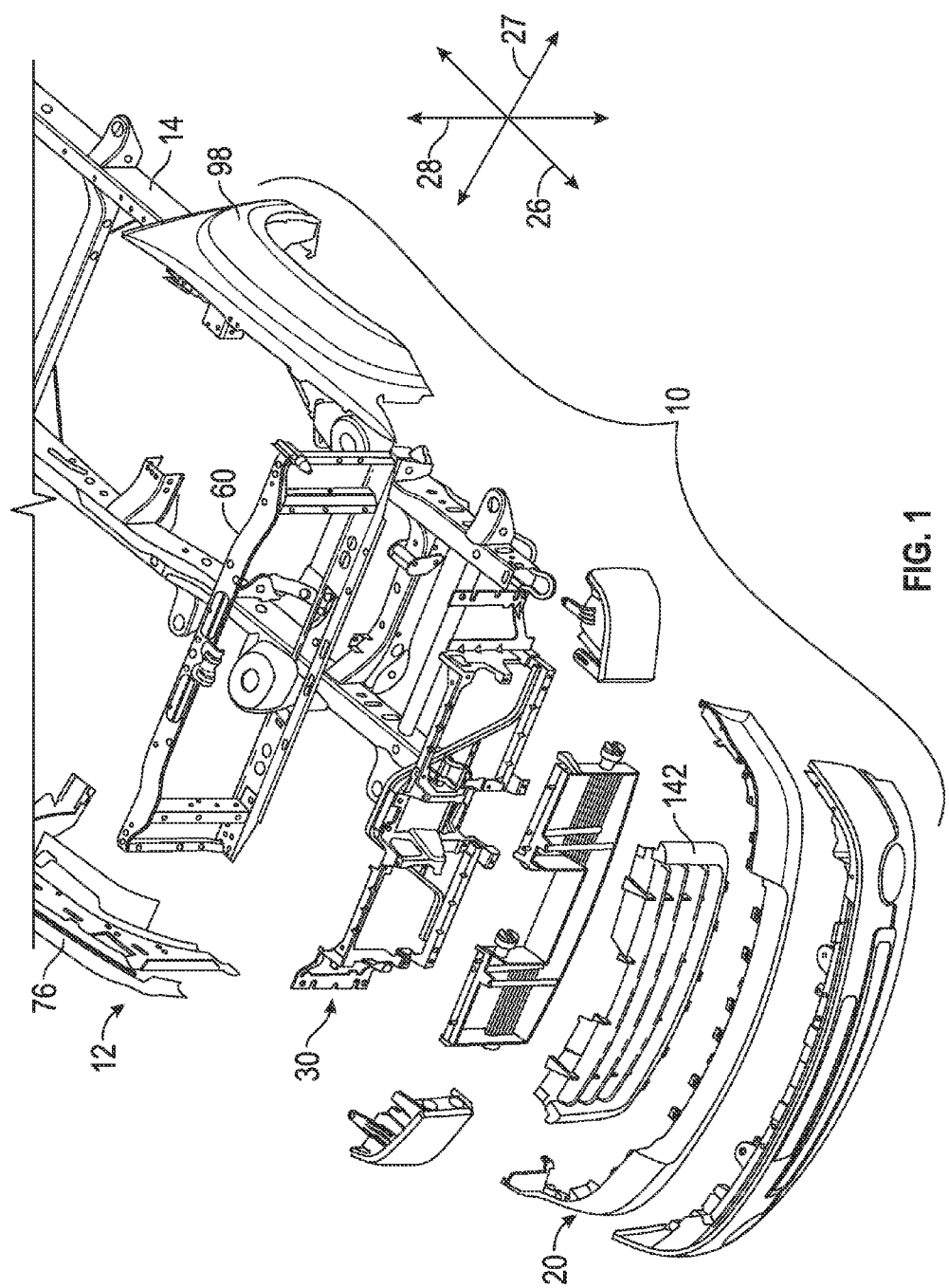
FIG. 1 is a simplified, partially disassembled view of a front end assembly of a vehicle.

The following description is merely exemplary in nature and is not intended to limit the present disclosure, its application or uses. It should be understood that throughout the drawings, corresponding reference numerals indicate like or corresponding parts and features.

Referring to FIG. 1, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and sub-assemblies for the vehicle 12. Supported components and sub-assemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending from what is commonly referred to as an "A-pillar" to a forwardly disposed component, such as a bumper 20 for the vehicle 12. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. The positioning and reinforcement structure 30 also provides structural support for the attached components. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as positioning and reinforcement assembly 30 or GOR assembly. As will be described in detail below, the positioning and reinforcement structure 30 includes locators, fastening features, and other critical dimensional relationship interfaces of several components and sub-assemblies. Such components and sub-assemblies typically include fender assemblies, headlamps, grills, fascias, bumpers and bumper attachment features, hoods and under-hood closeout panels, air baffles and radiator supports, for example. It is to be understood that the preceding list is merely illustrative of the numerous components and sub-assemblies which may be included in the front end assembly 10 and may benefit from the positioning and reinforcement structure 30. Exemplary components and sub-assemblies will be described in detail below. As used herein, an axial direction, or a fore-aft direction 26 refers to a direction that extends frontward and rearward along an axis of the vehicle, a cross-car direction 27 refers to a direction that extends laterally or across the vehicle and a vertical direction 28 refers to a direction that extends upwardly and downwardly. In one embodiment, these directions are mutually orthogonal with regard to one another.

Figure 2:
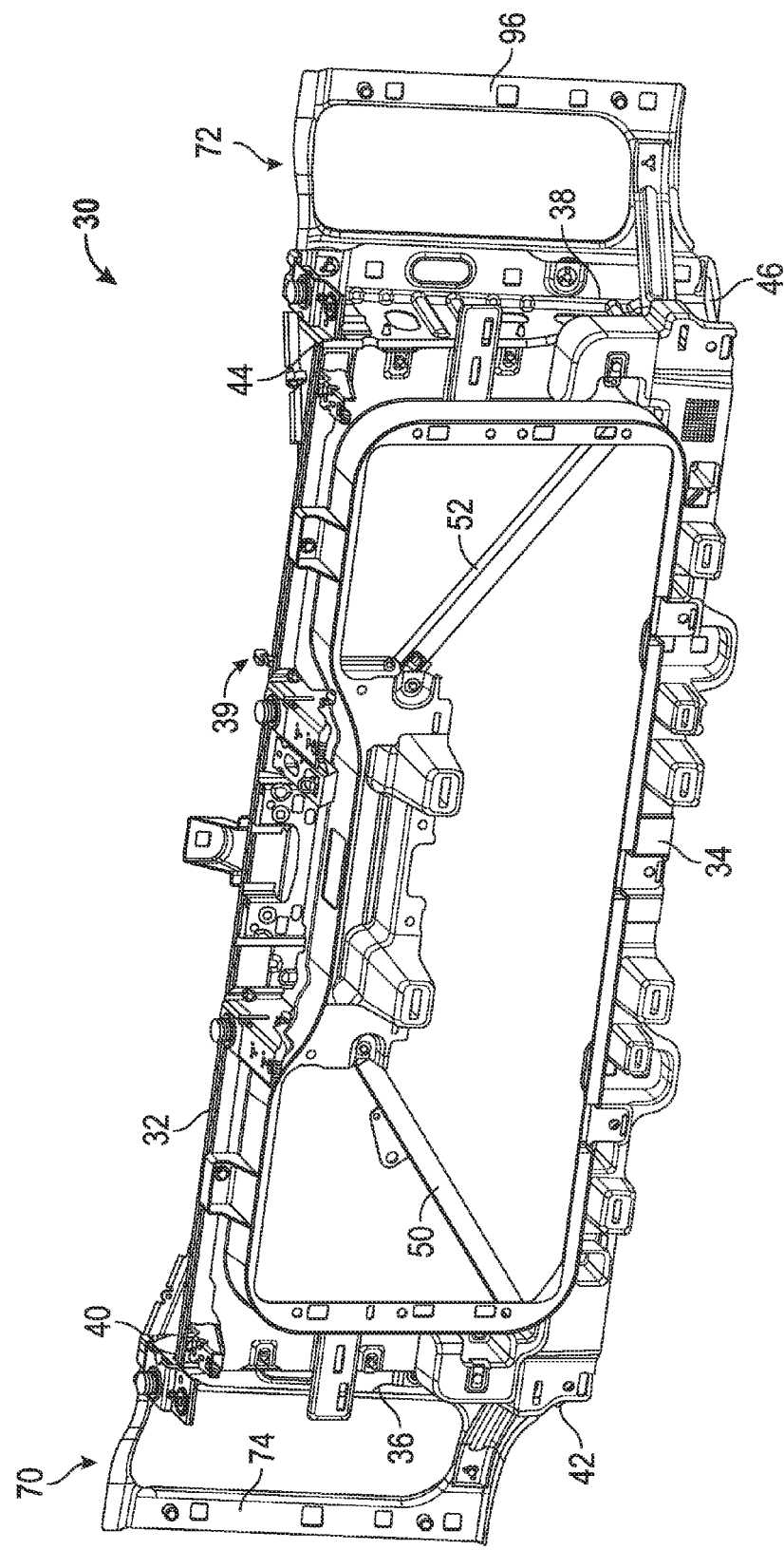
FIG. 2 is a perspective view of a positioning and reinforcement structure of the front end assembly.
Figure 3:
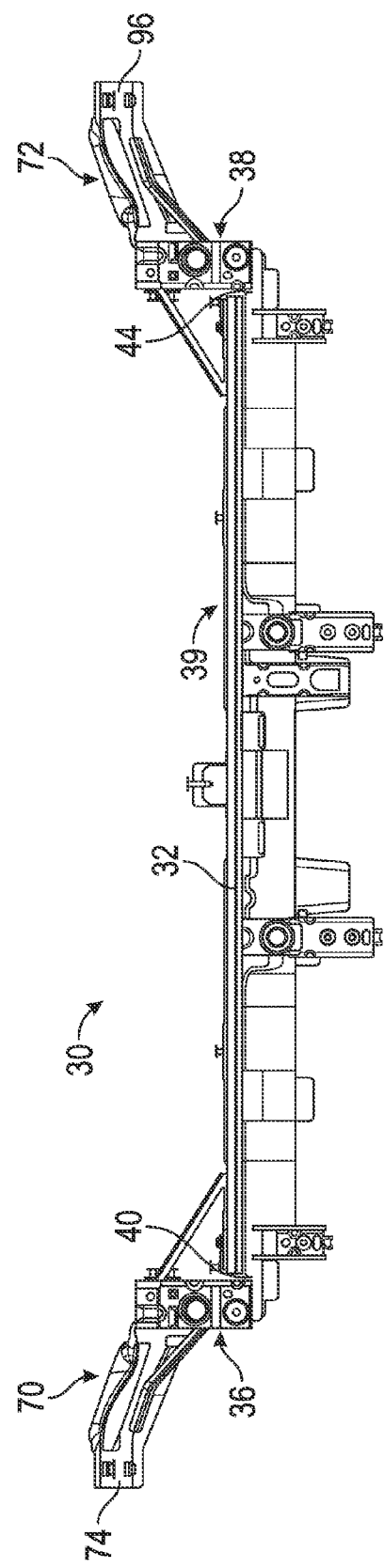
FIG. 3 is a top plan view of the positioning and reinforcement structure.

Referring now to FIGS. 2 and 3, in conjunction with FIG. 1, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in the cross-car direction 27 and relatively parallel to each other. The first side member 36 and the second side member 38 extend relatively parallel to each other, but in the relatively vertical direction 28. As may be understood the positioning and reinforcement structure 30 is therefore a substantially cross-car extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form an integral formation process so as to form an integral positioning and reinforcement structure 30, such as by casting, molding, or welding process, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Irrespective of the precise attachment, the top support member 32, the bottom support member 34, the first side member 36 and the second side member 38 form a central portion 39 of the positioning and reinforcement structure 30. Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30 or GOR structure may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Figure 4:
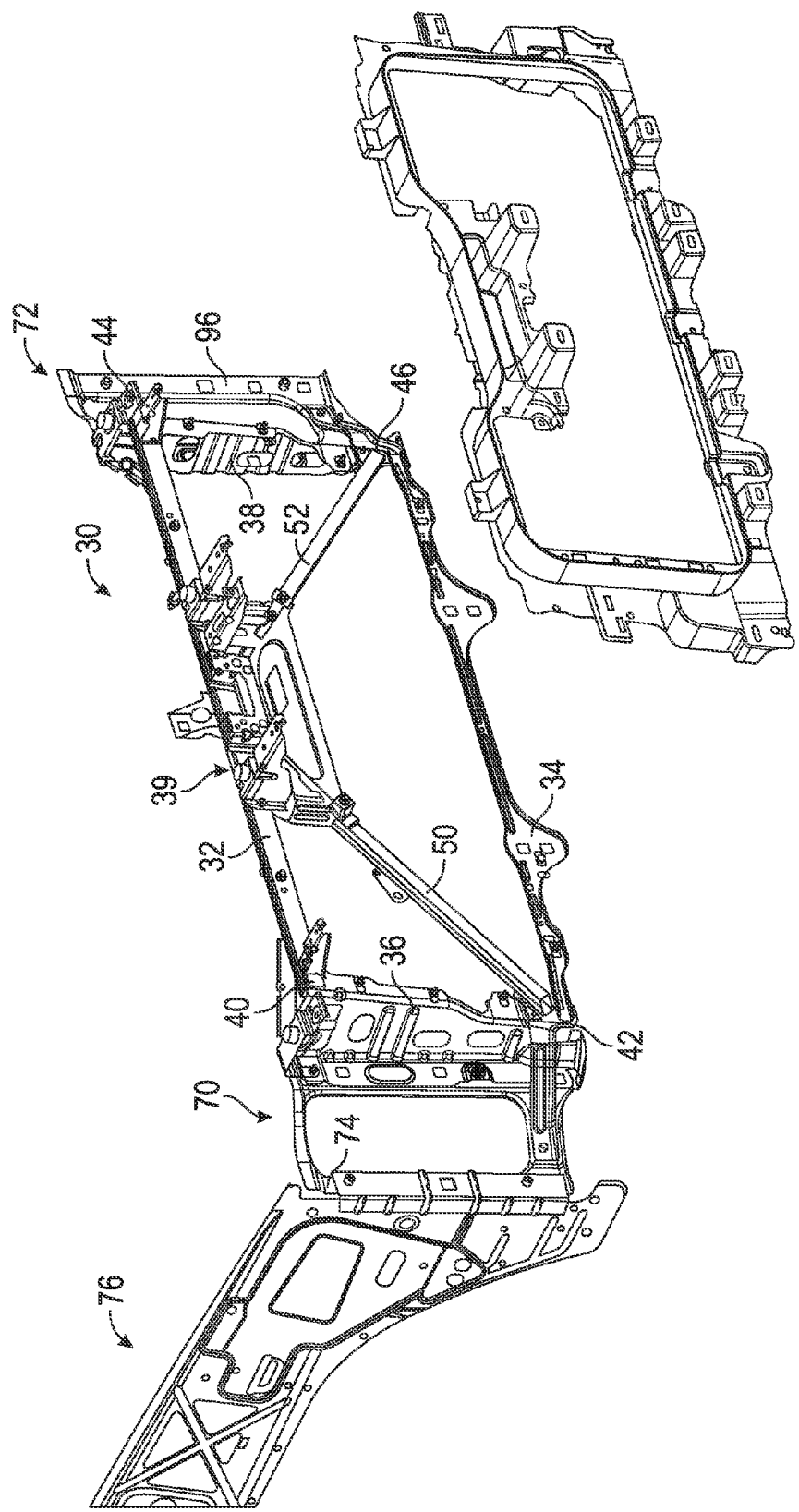
FIG. 4 is a partially disassembled perspective view of the positioning and reinforcement structure.
Figure 5:
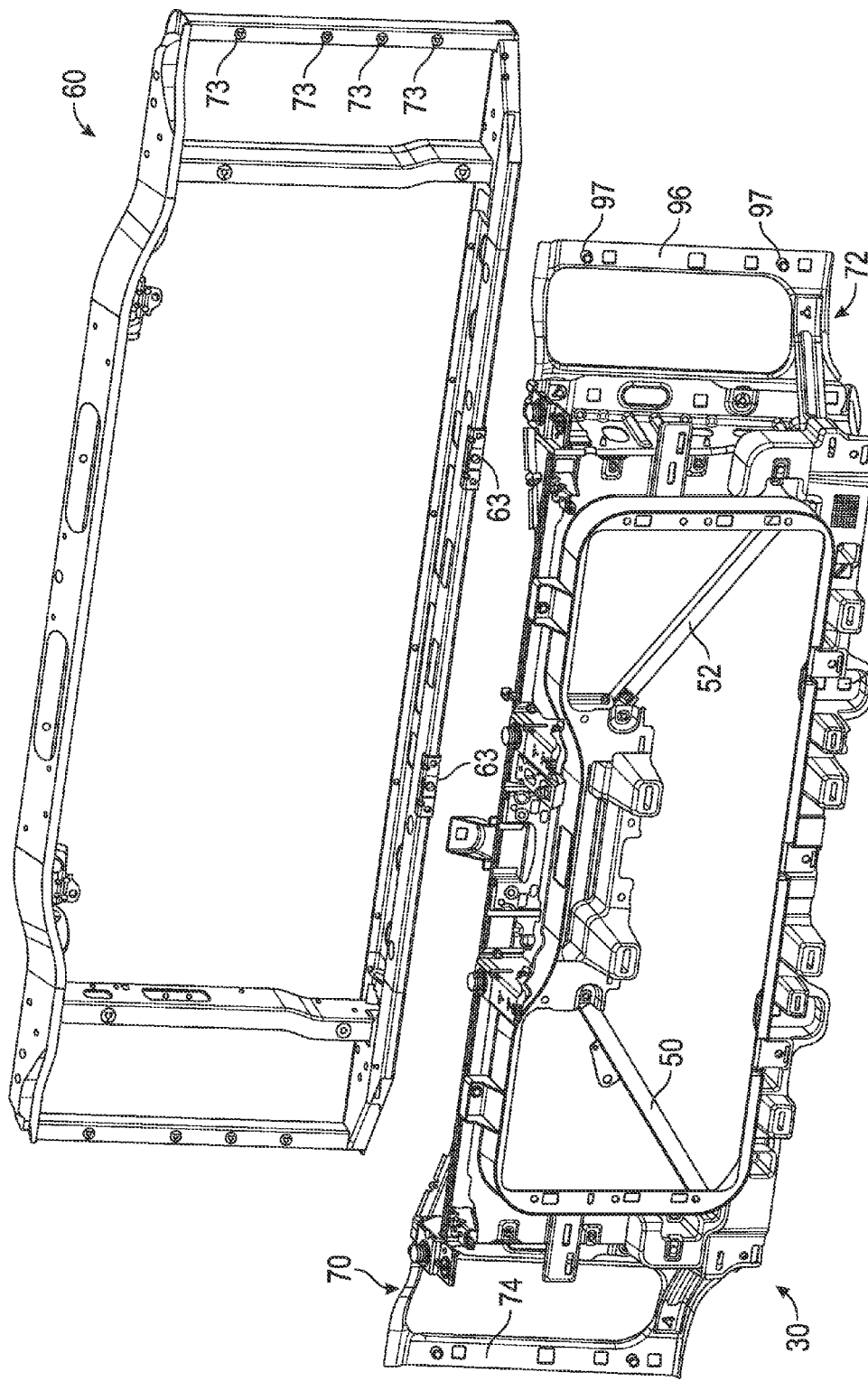
FIG. 5 is a perspective view of a radiator support prior to operable coupling with the positioning and reinforcement structure.
Figure 6:
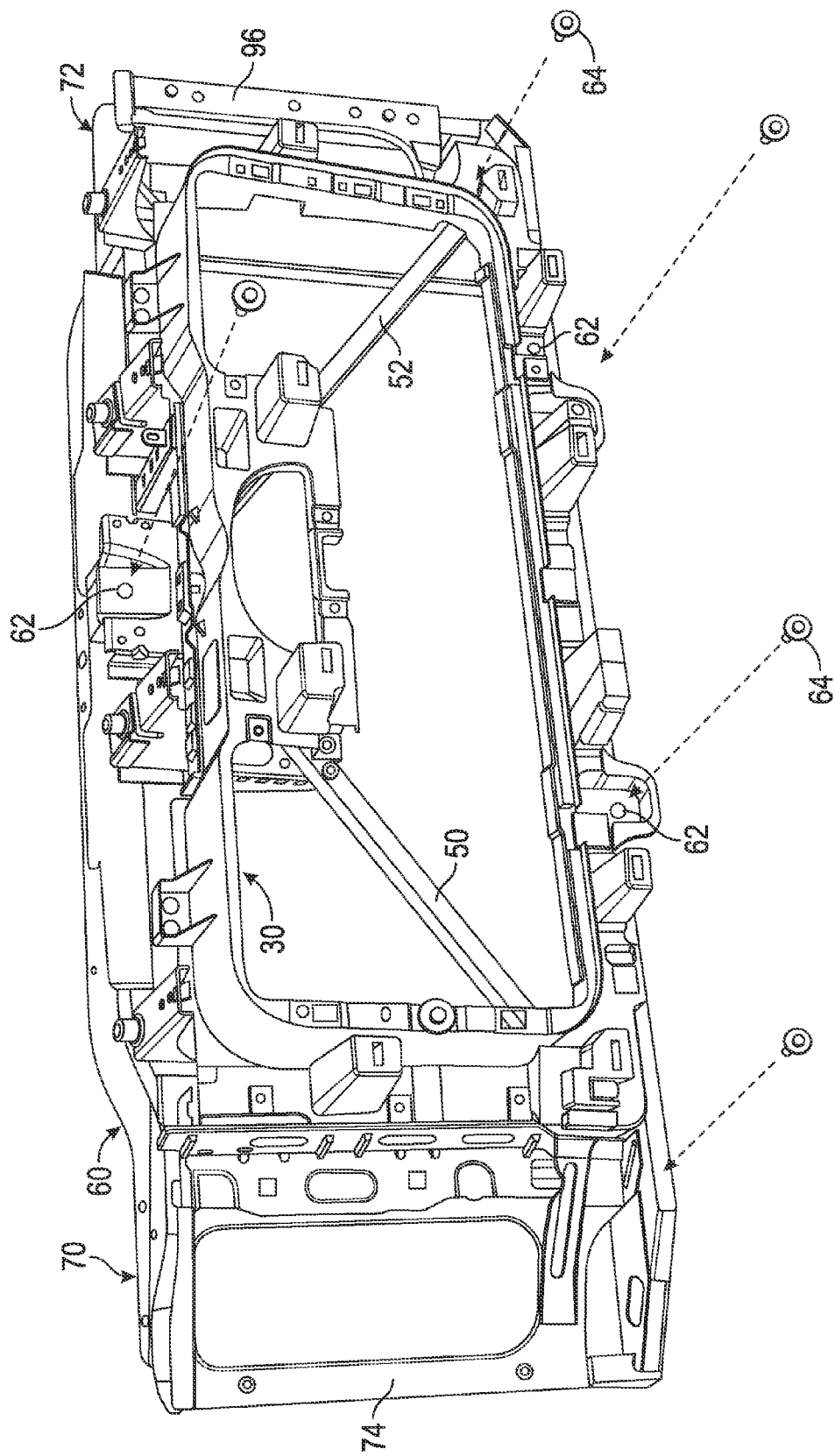
FIG. 6 is a perspective view of the radiator support and the positioning and reinforcement structure operably coupled.

Referring now to FIGS. 4-6, a radiator support 60 is configured to operably couple to an aft portion of the positioning and reinforcement structure 30. A plurality of apertures 62 are disposed in numerous locations along the positioning and reinforcement structure 30 that correspond to receiving structures 63 disposed within a front face of the radiator support 60. A plurality of mechanical fasteners 64 are employed and extend through the plurality of apertures 62 into the receiving structures of the radiator support 60 to fixedly retain the positioning and reinforcement structure 30 to the radiator support 60. It is to be appreciated that although the positioning and reinforcement structure 30 and the radiator support 60 are ultimately disposed in a fixed relationship to each other, a loose fitting relationship between the positioning and reinforcement structure 30 and the radiator support 60 is employed during several assembly phases of the front end assembly 10. This is achieved by partially installing mechanical threaded fasteners. Specifically, while the radiator support 60 is fixedly secured to the frame 14, the positioning and reinforcement structure 30 has at least one degree of freedom with respect to displacement relative to the radiator support 60. Such a relationship allows the positioning and reinforcement structure 30 to move during mounting of other components to the positioning and reinforcement structure 30. The tight, fixed relationship between the positioning and reinforcement structure 30 and the radiator support 60 is not established until various other components of the front end assembly 10 are properly located and mounted, as will be described in detail below.

Figure 7:
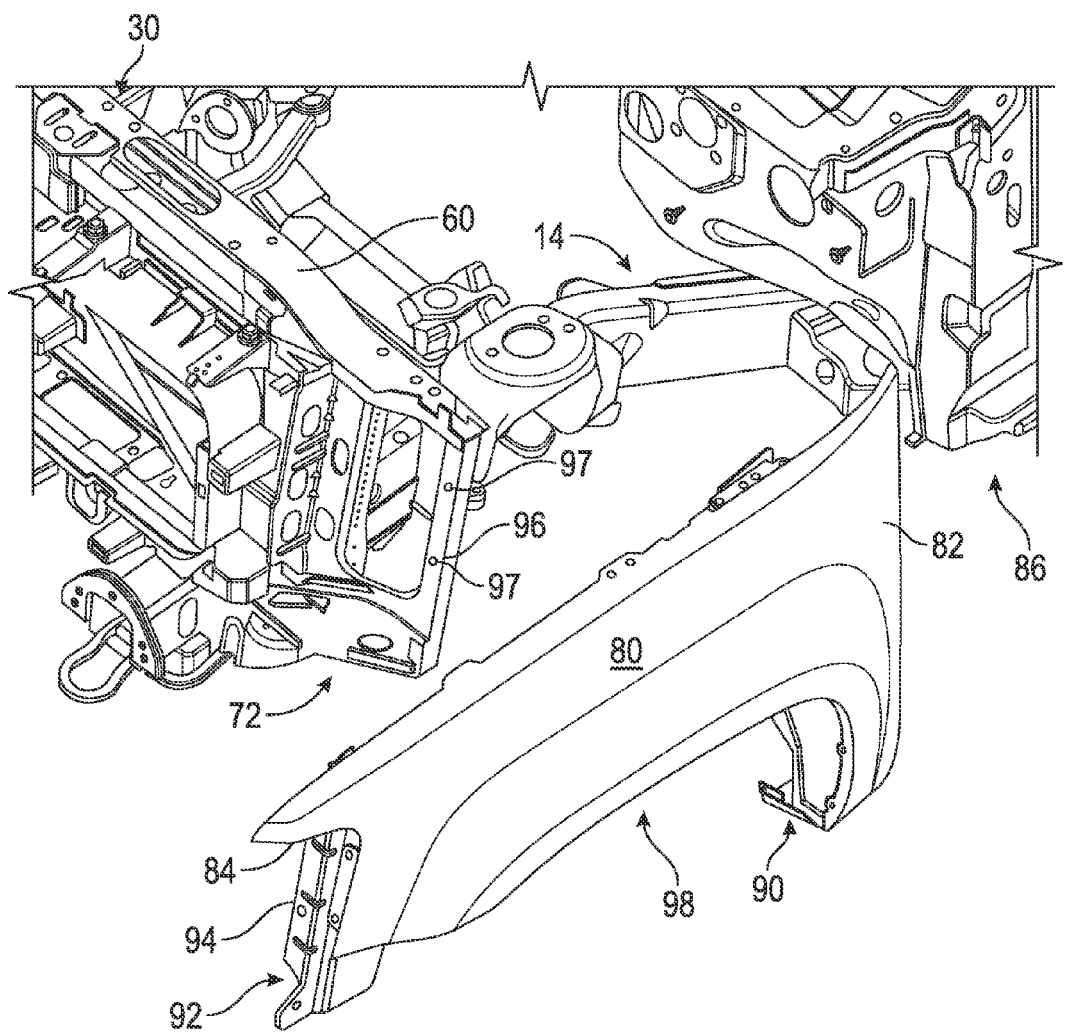
FIG. 7 is a top, front perspective view of the fender assembly.
Figure 8:
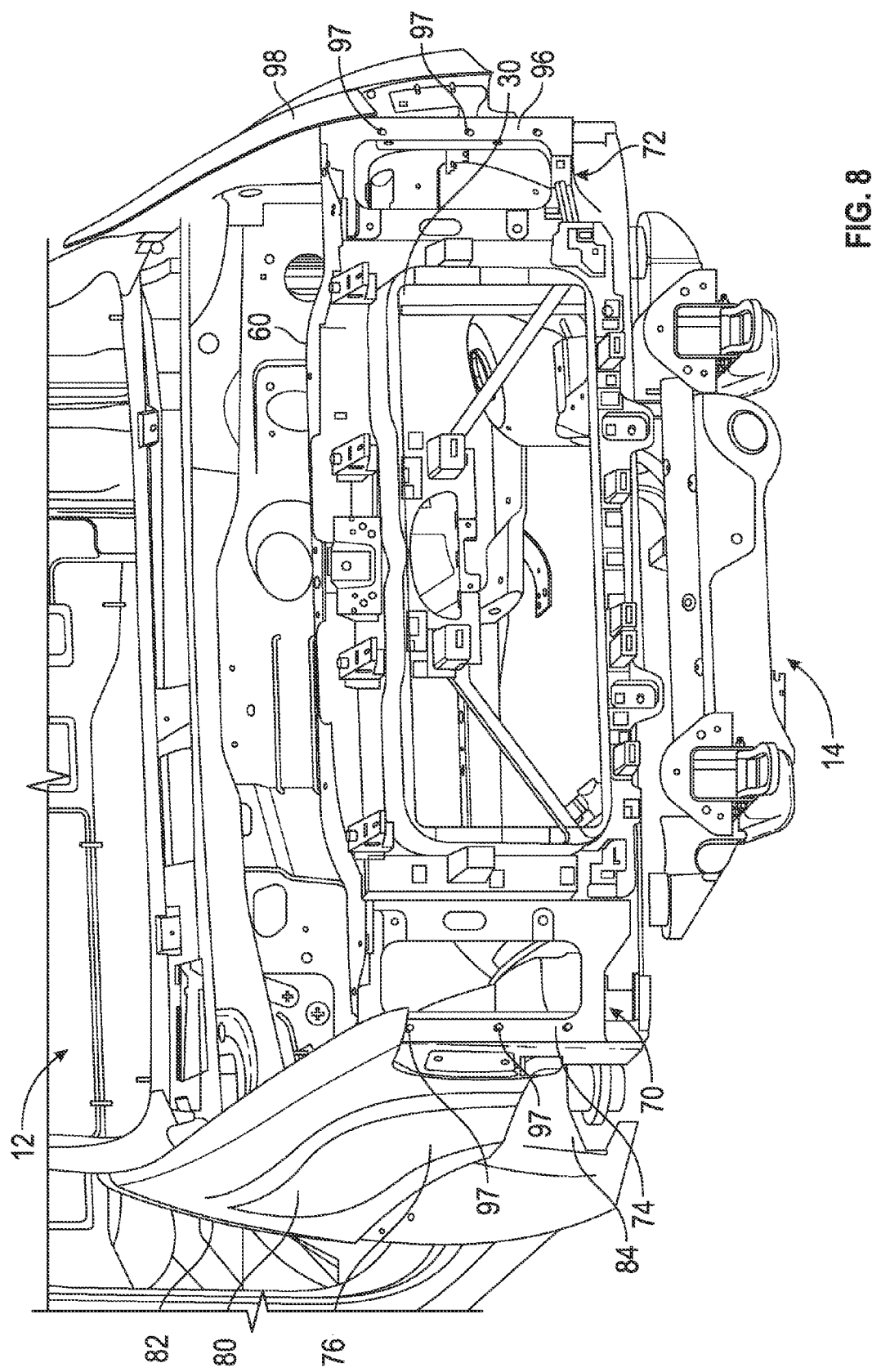
FIG. 8 is a perspective view of the front end assembly partially assembled.

Referring again to FIGS. 2 and 3, as well as FIGS. 7 and 8, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. As will be described below, a second fender assembly 98 is also included and comprises identical components as that of the first fender assembly 76, such that common reference numerals are employed. Additionally, reference to the illustrated embodiments may interchangeably denote components of the first fender assembly 76 and the second fender assembly 98 for purposes of discussion. The first fender assembly 76 and the second fender assembly each include a fender 80 having an aft end 82 and a forward end 84, with the aft end 82 being fixable to a region in close proximity to a front edge 86 of a vehicle door opening.

The forward end 84 of the fender 80 includes a fender flange 92 having one or more apertures 94 for receiving one or more pins 97 extending forwardly from the first side flange 74 of the first wing structure 70, thereby establishing a displaceable relationship between the first fender assembly 76 and the positioning and reinforcement structure 30 and setting the positioning and reinforcement structure 30 in the vertical direction 28 (FIG. 1), while setting the positioning and reinforcement structure 30 in the vertical direction.

The second wing structure 72 includes a second side flange 96 proximate an outermost location of the second wing structure 72 for fixing the positioning and reinforcement structure 30 to the second fender assembly 98. As noted above, the second fender assembly 98 is a mirror image of the first fender assembly 76 and is disposed at an opposite cross-car location of the vehicle 12, such that detailed description of the second fender assembly 98 is unnecessary, as are associated reference numerals. Similar to the first fender assembly 76, the second fender assembly 98 mounts to a region proximate a front edge 86 of a vehicle door opening and a displaceable relationship between the second fender assembly 98 and the positioning and reinforcement structure 30 is established by disposal of the fender flange 92 over at least one pin 97 of the second side flange 96.

The first fender assembly 76 and the second fender assembly 98 are each attached to the radiator support 60 with one or more mechanical fasteners, such as shoulder bolts, extending through at least one location proximate the first side flange 74 and the second side flange 96 of the first wing structure 70 and the second wing structure 72, respectively, the mechanical fasteners further extending through corresponding receiving apertures 73 disposed in the radiator support 60. Fastening of the first fender assembly 76 to the radiator support 60 sets the radiator support 60 in a fore-aft direction. The mechanical fasteners may comprise a threaded fastener, such as a shoulder bolt, which draws the radiator support 60 forwardly to an aft surface of the positioning and reinforcement structure 30, thereby establishing a fore-aft plane that the radiator support 60 and the positioning and reinforcement structure 30 are located in. Specifically, the first fender assembly 76 and the second fender assembly 98 determine the fore-aft location of the radiator support 60 and the positioning and reinforcement structure 30 upon engagement of the first fender assembly 76 and the second fender assembly 98 with the positioning and reinforcement structure 30 and the radiator support 60. As described above, the radiator support 60 has a loose fitting relationship with the positioning and reinforcement structure 30 during at least a portion of the assembly, and a slipping relationship between the radiator support 60 and the positioning and reinforcement structure 30 in the cross-car direction 27 (FIG. 1) and the up-down direction is maintained subsequent to establishing the fore-aft location.

Figure 9:
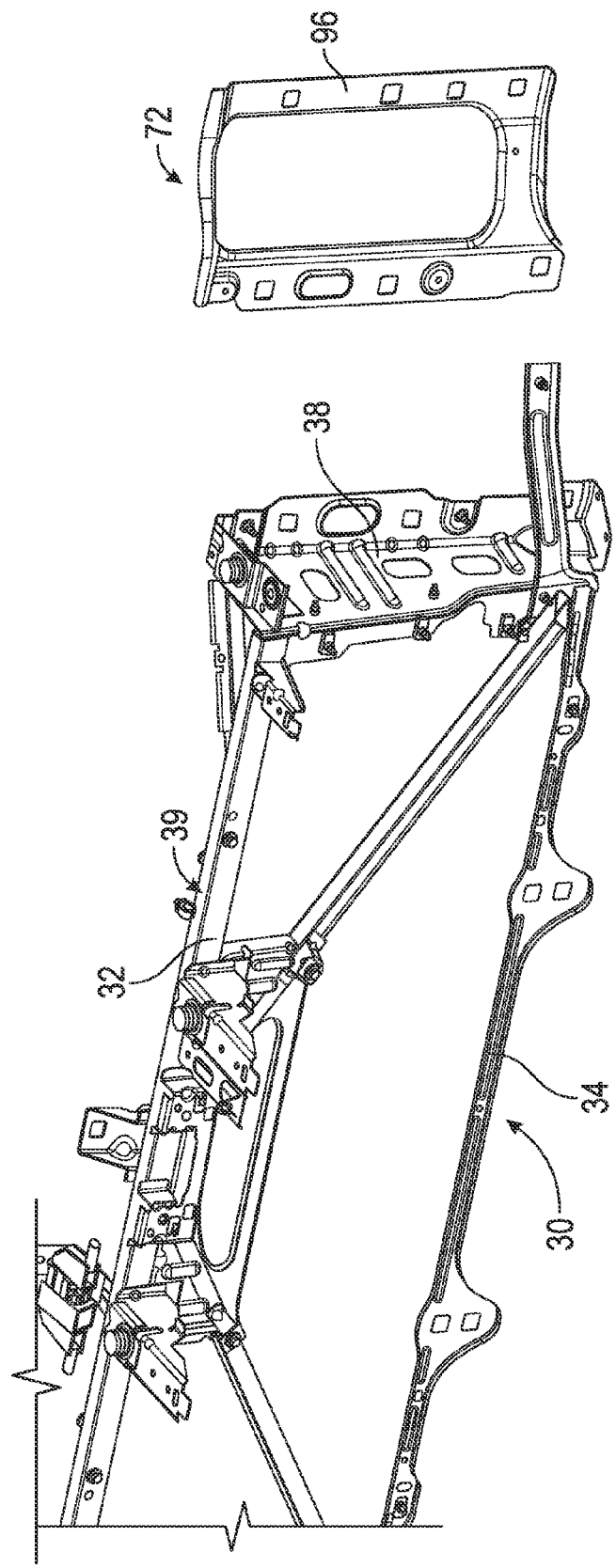
FIG. 9 is a perspective view of a wing structure detached from a central portion of the positioning and reinforcement structure.

Referring to FIG. 9, the second wing structure 72 is decoupled from the central portion 39, however, as noted above, the first wing structure 70 and the second wing structure 72 are both detachably, or removably, coupled to the central portion 39 of the positioning and reinforcement structure 30, while each maintains a fixed relationship with the first fender assembly 76 and the second fender assembly 98, respectively. Such a configuration provides the ability to decouple the central portion 39 from the first wing structure 70 and the second wing structure 72, thereby providing access to components disposed rearwardly of the central portion 39. Access to these components facilitates servicing and repair efforts of various components. As described above, the positioning and reinforcement structure 30, and more specifically the central portion 39, are coupled to numerous surrounding components, such as the radiator support 60, hood latch components and headlamp assemblies, for example. Decoupling of these components, among others, from the central portion 39, in combination with decoupling of the central portion 39 from the first wing structure 70 and the second wing structure 72, provides a large central opening proximate a forward region of the vehicle 12.

It is to be appreciated that numerous other components may be removed prior to or subsequent to removal of the central portion 39, thereby granting access to additional components for servicing or repair needs. Advantageously, large, expensive components, such as the first fender assembly 76 and the second fender assembly 98, may avoid removal.

Figure 10:
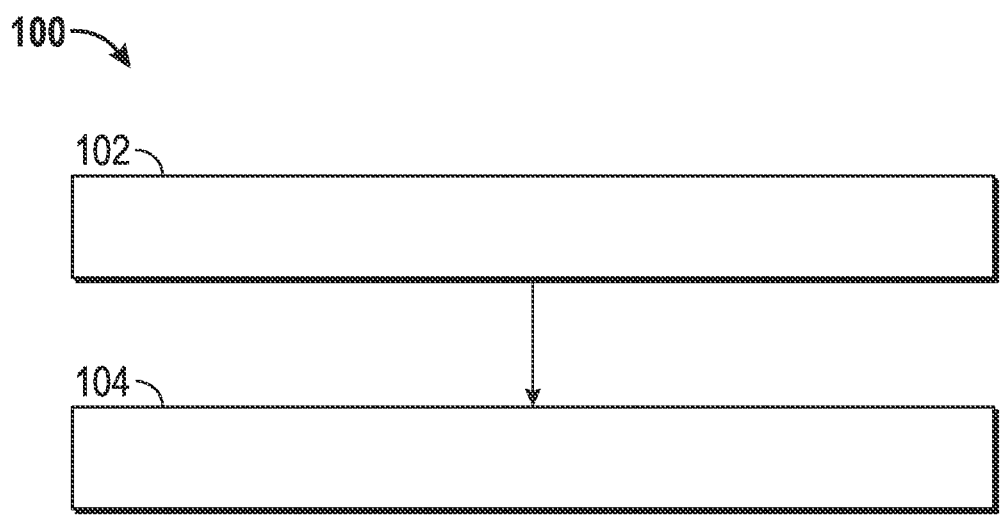
FIG. 10 is a flow diagram illustrating a method of disassembling the front end assembly.

A method of disassembling a front end assembly for a vehicle 100 is also provided as illustrated in FIG. 10 and with reference to FIGS. 1-9. The vehicle 12, and more specifically the front end assembly 10 have been previously described and specific structural components need not be described in further detail. The method of disassembling a front end assembly of a vehicle 100 includes decoupling 102 the central portion 39 of the positioning and reinforcement structure 30 from the first wing structure 70 and the second wing structure 72. The central portion 39 is also decoupled 104 from at least one of several automotive components described above, thereby providing access to a plurality of components proximate the front end assembly 10.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A detachable positioning and reinforcement structure comprising:
   a first wing structure having a first side flange at an outermost location of the first wing structure in a cross-car direction, the first side flange operably coupled to a first fender assembly;
   a second wing structure having a second side flange at an outermost location of the second wing structure in the cross-car direction, the second side flange operably coupled to a second fender assembly; and
   a central portion mechanically fastened and detachably coupled to the first wing structure in a repeatedly removable manner at a location spaced inwardly in the cross-car direction from the first side flange, the central portion mechanically fastened and detachably coupled to the second wing structure in a repeatedly removable manner at a location spaced inwardly in the cross-car direction from the second side flange, and wherein the central portion is mechanically fastened to a third component in a repeatedly removable manner, wherein the third automotive component is disposed rearwardly of the central portion.

2. The detachable positioning and reinforcement structure of claim 1, the first fender assembly comprising a first tender flange having a first plurality of apertures for receiving a first plurality of protrusions extending from a first side flange of the first wing structure.

3. The detachable positioning and reinforcement structure of claim 1, the second fender assembly comprising a second fender flange having a second plurality of apertures for receiving a second plurality of protrusions extending from a second side flange of the second wing structure.

4. The detachable positioning and reinforcement structure of claim 1, the central portion comprising a first side member mechanically fastened to the first wing structure.

5. The detachable positioning and reinforcement structure of claim 1, the central portion comprising a second side member mechanically fastened to the second wing structure.

6. The detachable positioning and reinforcement structure of claim 1, the third automotive component comprising a radiator support.

7. The detachable positioning and reinforcement structure of claim 6, the radiator support mechanically fastened to the detachable positioning and reinforcement structure.

8. The detachable positioning and reinforcement structure of claim 1, wherein decoupling of the central portion from the first wing structure, the second wing structure and the third automotive component provides access to a plurality of front end assembly components.

* * * * *